United States Patent [19]

Quick

[11] 4,357,926

[45] Nov. 9, 1982

[54] POLLUTION EMISSION CONTROL AND FUEL SAVING DEVICE FOR INTERNAL COMBUSTION ENGINES

[76] Inventor: Thomas E. Quick, 1616 Park Pl., Wichita, Kans. 67203

[21] Appl. No.: 722,601

[22] Filed: Sep. 13, 1976

Related U.S. Application Data

[63] Continuation of Ser. No. 454,475, Mar. 25, 1974, abandoned.

[51] Int. Cl.³ .............................................. F02M 31/00
[52] U.S. Cl. ..................................... 123/545; 123/547
[58] Field of Search ......... 123/133, 122 AB, 122 AC; 261/144, 145; 48/180 H, 180 R; 165/52, 154

[56] References Cited

U.S. PATENT DOCUMENTS

| | | | |
|---|---|---|---|
| 807,185 | 1/1937 | Malinkine | 123/122 AB |
| 1,242,975 | 10/1917 | Planche | 165/154 |
| 1,476,315 | 12/1923 | Wilsey | 123/122 AB |
| 1,499,800 | 7/1924 | Bannister | 123/122 AB |
| 3,858,564 | 1/1975 | Beatenbough | 123/122 AB |
| 3,918,424 | 11/1975 | Anderson | 123/122 AB |

FOREIGN PATENT DOCUMENTS 937272  12/1946  France .................................. 165/52

Primary Examiner—Ronald H. Lazarus
Attorney, Agent, or Firm—Robert E. Breidenthal

[57] ABSTRACT

For the purpose of increasing internal combustion engine efficiency and of decreasing the polluting content of the engine exhaust, the present invention centrifuges a conventionally produced liquid fuel-air mixture to separate and maintain the liquid content thereof in contact with a heated surface to collect latent heat energy until the same is evaporated and then using the molecular spreading energy forces to attain substantially equally spaced fuel vapor molecules among all of the equally spaced air molecules as they move into the combustion chamber of the engine, to thereby assure a more complete molecular fuel-air mixture, for more complete, efficient and pollution emission free combustion.

13 Claims, 9 Drawing Figures

POLLUTION EMISSION CONTROL AND FUEL SAVING DEVICE FOR INTERNAL COMBUSTION ENGINES

This is a continuation of application Ser. No. 454,475, filed Mar. 25, 1974, now abandoned.

This invention relates to new and useful improvements in the supply of a more homogeneous fuel-air mixture to internal combustion engines, and more particularly pertains to a method of and apparatus for vaporizing and energizing only the liquid of a fuel-air stream for rapidly diffusing the fuel molecules into all of the air as it moves between the carburetor and the inlet valves of a conventional automobile engine.

The supplying of a fuel-air mixture constituted of air and a normally volatile liquid fuel such as gasoline in the usual manner leaves much to be desired insofar as engine efficiency and/or the pollution effects of the exhaust by reason of incomplete combustion. Such deleterious consequences of improper carburation are primarily due to the fuel-air mixture not being homogeneous especially inasmuch as a considerable proprotion of the volatile normally liquid fuel remains in the liquid phase (usually as a disperse phase in the form of a mist or fog of variously sized liquid droplets) throughout the passage of the fuel-air mixture to the combustion chamber.

Prior efforts to effect a complete vaporization of the volatile liquid fuel by heating the fuel-air mixture has been counter productive in that much more heat is supplied than can be utilized since approximately 10,000 volumes of air must be heated for each volume of liquid fuel evaporated with the ill consequences being a diminution of the volumetric efficiency of the engine coupled with either engine detonation or the necessity of higher octane fuel.

Referrence can be made to the following U.S. patents for an appreciation of the most pertinent prior art known:

U.S. Pat. No. 1,597,197—Horning; Aug. 24, 1926
U.S. Pat. No. 2,066,922—Wolfard; Jan. 5, 1937
U.S. Pat. No. 1,790,812—Hall; Feb. 3, 1931
U.S. Pat. No. 2,259,480—Morris; Oct. 21, 1941
U.S. Pat. No. 1,659,659—McCuen; Feb. 21, 1928
U.S. Pat. No. 3,319,611—Terazawa; May 16, 1967
U.S. Pat. No. 3,102,516—Gist et al; Sept. 3, 1963

Pollutive engine exhaust is largely, if not entirely, due to incomplete fuel combustion and that such incomplete fuel combustion, despite the use of more than a stoichiometric proportion of air, is due to the fuel-air mixture being incompletely mixed, that is, falling far short of being a homogeneous or completely mixed fuel-air mixture which requires that the liquid fuel be placed entirely in the vapor (that is, gaseous) state and such gas intimately mixed with the air. Merely vaporizing a portion of the fuel with a significant portion being entrained as a disperse liquid phase is not sufficient to realize anything near complete combustion. Even the finest dispersions or mists of liquid fuel practically realizable involve collections or aggregations of very great numbers of fuel molecules, with many of such molecules being deeply buried within such aggregations and shielded from direct contact or collision with the oxygen molecules contained in the air as must occur if the fuel molecule is to be fully oxidized and combustion carried to completion.

Some faint conception of the number of molecules present in a particle of fuel mist can be obtained on realization that under standard temperature and pressure a single cubic centimeter of vaporized fuel contains about twenty-six thousand million billion (26,687,000,000,000,000,000) molecules according to Avogadro's law of gases and Loschmidt's number.

In order to achieve a homogeneous fuel-air misture of air and the stupendous number of fuel molecules mentioned in the preceding paragraph, it is first necessary to vaporize the corresponding quantity of liquid fuel and then to homogeneously mix such vapor or gas with about fifty times as great a volume (stoichiometric quantity) of air.

In an ordinary automobile engine operating under typical conditions, the mixing of the fuel and the air must take place in a quite brief period of time, namely, about one-hundredth part of a second between the carburetor and the cylinder.

Vaporizing and perfectly mixing a liquid fuel with a stoichiometric quantity of air in such a brief interval of time is virtually an impossibility and the degree to which any system fails to attain the desired perfection determines the measure of pollution emission in the exhaust.

Since a cubic centimeter of gasoline fuel vapor contains 26,687,000,000,000,000,000 molecules, and since this vapor has expanded more than 200 times its volume in changing from a liquid to a vapor, this means that a drop of liquid gasoline about 1/16 inch in diameter contains approximately 26,000,000,000,000,000,000 molecules of fuel.

If the momentum of air passing through the carburetor and acting upon the inertia of the fuel could possibly break this 1/16 inch diameter particle or droplet of fuel into 26,000,000,000 particles of liquid fuel fog, then each of these particles of fuel fog (so small it would take a microscope to see) would still contain an average of 1,000,000,000 molecules each.

On attempting to crowd approximately 26 billion particles of liquid fuel fog into approximately three cubic inches of air (for a reasonably correct mixture ratio), the fuel particles tend to contact each other and fuse into larger droplets as the fog in clouds contact each other to form raindrops.

The point is that liquid fuel particles or droplets have no repelling forces to cause them to separate and distribute themselves equally apart from each other; while fuel vapor molecules do have relatively strong repelling forces that spread them throughout the container in which they are confined. (Reference: Dalton's law of Partial Pressures of Gases.)

Air will not diffuse readily into liquid fuel but it diffuses readily into fuel vapors; so to produce a combustible mixture, the fuel must first be vaporized.

To vaporize liquid fuel, that fuel must receive energy from some place sufficient to pry the molecules further apart. This energy is in the form of heat that must be withdrawn from some place. In conventional engines that portion of fuel that does become vaporized has withdrawn the required heat from the air in the manifold.

In conventional engines, the downward movement of the piston reduces the pressure of the air in the intake manifold to draw air and fuel in through the carburetor. This reduction in pressure under normal conditions reduces the temperature of the air about 30 to 40 degrees. This considerably reduces the opportunity of the fuel particles to withdraw sufficient heat from the air to produce evaporation. When, if it were possible to withdraw enough heat from the air to evaporate as much as 50% of the fuel, that would lower the temperature of the air about another 30 degrees, or to about zero or below, at which point further evaporation would be practically nil.

In other words, even if equilibrium were such (approached adiabatically and under the pressure prevailing in the intake system) to constitute a completely homogeneous mixture, such an equilibrium is not even approximated because of the extremely brief period of time available in ordinary systems (on the order of one hundredth of a second) and because of the low temperature of the liquid fuel.

The speed of chemical and physical processes as they proceed toward system equilibrium are generally slowed with reduced temperature. In this case the vapor pressure of the liquid is reduced which slows down the evaporation process. It is an objective of this invention to sustain an adequate liquid fuel vapor pressure with the introduction of a minimum amount of heat into the system.

The substantial benefits realized in the practice of the present invention are due to the fact that unwarranted reliance has heretofore been placed on the effectiveness of the air stream striking the thin stream of gasoline introduced in the carburetor in uniformly dispersing the gasoline throughout the air and that the liquid particles will all evaporate before entering the combustion chamber. The brevity of time and the low temperature resulting from such evaporation as does occur coupled with the fact that the liquid fuel must be homogeneously spread throughout about ten thousand times its original volume make it quite plain that such assumptions are in very large measure wishful thinking.

Remembering that evaporation takes time, lots of it compared with the approximately 1/100 part of a second or less it takes for the mixture to move from the carburetor into the combustion chamber, consequently the fuel reaches the combustion chamber with possibly not much more than one half of it evaporated, much less diffused, and equally distributed throughout the combustion chamber so each molecule of fuel can find and reach oxygen molecules that are scattered through the nitrogen of the air and be burned.

Therefore, when ignition occurs there will possibly be thousands—or even millions—of little volumes of concentrated fuel with not enough air diffused into them to provide a combustible mixture. Then as the fuel that has mixed with air sufficient to provide a combustible mixture and burned, and expanded to approximately four or five times its original volume, this leaves less opportunity for the yet unburned fuel to find oxygen. As the burned high temperature gases diffuse into the fuel rich areas that have not found oxygen to burn, the carbon dioxide molecules while at this high temperature, gives up one of its oxygen atoms to the unburned carbon of the fuel, forming two molecules of carbon monoxide. Also these burned hot gases, while at their extremely high temperatures and under peak pressure diffuse through the air and may cause some of the oxygen and nitrogen molecules to be smothered and overheated to the point of fusion, this producing nitric oxide.

As the piston moves down, evaporation, diffusion of the vapors and combustion continues; but the exhaust valve opens before all of the fuel and oxygen can be consumed in combustion. So, in the exhaust gases are found water vapor, carbon dioxide, some hydrocarbons, some oxygen, nitrogen, and too much carbon monoxide and nitric oxide which are regarded as pollution.

Without so many fuel rich volumes or areas in the combustion chamber, there would not be so much carbon, carbon monoxide and hydrocarbons in the exhaust gases; and without so many volumes or areas in the combustion chamber occupied with air without fuel, there would not be so much oxygen and nitric oxide in the exhaust gases.

According to Dalton's law of partial pressures, when a gas is introduced into a container of air or another gas, the molecules of both gases diffuse through each other and distribute themselves equally throughout the container. The rapid diffusion of the gases is motivated by the repelling forces of the molecules, which causes a rush to equalize their pressure throughout the container.

It must be concluded that complete combustion is impossible without complete distribution of all of the fuel molecules within the very short time allowed for complete evaporation, diffusion and equal distribution of the fuel molecules in all of the air. Also complete distribution is impossible without sufficient heat energy for complete evaporation of all of the fuel. Then, after evaporation, sufficient time must be allowed for the fuel molecules to diffuse into all of the air and attain equal distribution by the time for ignition in the combustion chamber.

The present invention enables at little cost even for extant automobiles a very substantial realization of the perfect mixing desideratum discussed above. In addition, the present invention will serve to increase engine efficiency and thereby serve to alleviate to an appreciable extent the escalating demands upon the seriously depleted petroleum deposits. The increased efficiency flows not only from more complete combustion of the fuel but upon such combustion occurring while the piston is in the most efficient portion of its working stroke. The increased efficiency will also flow from reducing radiant heat loss to the cylinder walls, head and piston. Such radiant heat loss is substantial when the fuel-air mixture is quite imperfect and the combustion process produces a brilliant white flame that radiates (electromagnetic) energy to the confining walls of the combustion chamber. Such heat transfer by radiation is substantially greater with relatively imperfect mixing and entails a reduction of engine efficiency as well as engine cooling problems, higher engine temperatures, shortened engine life, and in general all the ill consequences of a high rate of heat production by an engine.

According to the present invention, the unvaporized part of the liquid fuel is preferentially heated by waste exhaust heat. Such preferential heating of the fuel yet remaining in the liquid phase is even more preferentially applied to the relatively larger sized droplets of liquid as Stoke's law comes into play during the centrifuging operation hereinafter set forth. Centrifuging or subjecting the air or vapor entrained droplets of liquid is very effective by reason of the liquid being many times greater in density than its vapor or air.

The unvaporized fuel is approximately 600 times as dense as air and consequently resists a change in velocity or direction of travel with a force about 600 times as great as that for air. This fact makes it possible to direct the liquid fuel particles against a limited hot surface area and retain the fuel against the hot surface area by centrifugal force long enough for the fuel to withdraw sufficient heat from the hot surface to completely evaporate the fuel.

When the liquid fuel particles attain their evaporation by the heat that has been transmitted to them, the molecular repelling forces of the vaporized molecules (according to Dalton's law of partial pressures of gases) cause the vaporized molecules of fuel to spread and diffuse rapidly throughout their container, which in this case is the intake manifold containing the air, the repelling forces of the vaporized fuel molecules (as with air and other gases) propel them to seek equally spaced equilibrium within their container; thus producing equally spaced distribution of all the molecules of fuel throughout their container, which means absolute and equal distribution of all of the fuel molecules within all of the air.

The simple mechanism for accomplishing the evaporation of the fuel consists of a spiral or helical path in the intake manifold and provisions for the exhaust gases to contact the outer wall of the intake manifold bend, whereby heat from the exhaust gases can be conducted through the outer wall of the portion of the intake manifold defining the path to heat the fuel that centrifugal force has moved against the inside of the outer wall portion in the intake manifold bend. As the fuel moves along the spiral or extended circular path, centrifugal force tends to hold the liquid fuel firmly against the hot surface so as to evaporate thereagainst during such prolonged contact. Without the centrifugal force being sustained for a sufficient period of time, the, liquid droplets may merely be impinged against a wall from which they may largely bounce away or otherwise become entrained again (as a liquid) in the air stream and thereafter receive only heat from the continuous gas phase in which they are entrained or immersed.

The exhaust gases that conduct heat into the intake manifold bend should be caused to cease contact with the intake manifold at the approximate point where all of the fuel in the intake manifold has been evaporated.

Since centrifugal force holds the fuel (which is approximately 600 times heavier than an equal volume of air) continuously in vaporizing contact with the hot surface until evaporated, the air has very little opportunity to receive any heat from the hot surface because the fuel receives most or practically all of the heat conducted through the intake manifold bend hot surface wall. The fuel also acts as an insulator between the hot surface and the air in the intake, permitting only the minimum of heat to reach the air. Thus the volumetric efficiency of the air entering the cylinders is substantially maintained.

Among the principal objects of the invention may be mentioned the provision of:

A method of forcibly withdrawing liquid fuel particles from suspension in the air, and placing them on a hot surface and forcibly retaining the fuel particles against the hot surface with centrifugal force until evaporated; A method of withdrawing cohesive liquid fuel particles from suspension in the air, applying molecular spreading repelling forces to the molecules, and releasing the molecules with their repelling forces back into diffusion with the air;

A means of retarding the velocity of the fuel particles around the hot surface of the intake manifold bend, by the use of very shallow obstructions; (something like a thin wire screen attached flat on the hot surface) to give the fuel particles time to completely evaporate before they pass the hot surface portion of the manifold bend;

A method of attaining substantially complete evaporation of the fuel particles in the intake manifold while conducting the absolute minimum amount of heat to the air in the intake manifold; and, A method of using a highly conductive material in combination with heat collecting fins along the outside of the intake manifold bend to collect heat from the exhaust gases and rapidly conduct the heat through the wall of the manifold bend to quickly evaporate the fuel.

The paramount objects of the invention are to reduce or eliminate the presence of pollutants (notably, incompletely oxidized substances such as raw fuel, carbon monoxide, carbon as well as various oxides of nitrogen) from the engine exhaust, and to improve the efficiency and cooler operation of the internal combustion engine by way of attaining a more equal molecular fuel distribution, that is, the production of a more nearly perfect homogeneous fuel-air mixture viewed on a molecular scale.

A reasonable working knowledge of the foregoing by the ordinarily skilled in the field of carburation is assumed, and in addition, such workers will customarily be conversant with:

The factors involved in computing stoichiometric proportions of fuel and air;

Chemical laws of mass action, chemical equilibrium, speed of reaction, and how these vary with temperature and pressure, presence of catalysts, etc. High temperature equilibriums involving carbon, carbon dioxide, water, carbon monoxide, oxidizing hydrogen, disassociated hydrogen, and oxygen. Nitrogen and oxygen systems are of importance also;

Factors determinative of flame propagation rates, such as mixtures, density, turbulence, shock waves, etc.;

The formation of oxides of nitrogen such as nitric oxide, and the character of the latter as a heat sink.

The invention possesses broad aspects as to both process or method and apparatus. A broad process aspect of the invention involves, in a carburation process wherein heat is supplied to the fuel of an imperfect fuel-air mixture constituted of a stream of air containing droplets of a volatile liquid fuel in order to rapidly vaporize substantially all of the liquid and to improve the intimacy of the fuel-air mixture prior to its introduction into the combustion chamber of an internal combustion engine, the improvement comprising supplying the heat energy preferentially to the relatively dense liquid phase of the fuel as compared to the vapor thereof by directing the stream to flow along a curvilinear path having a radially outermost portion thereby to urge preferentially the relatively dense liquid phase of the mixture toward the radially outermost portion of the curvilinear path, while contacting the fuel-air stream along the radially outermost portion of its path by a heat conducting material, with the rate of supply of heat energy to the fuel-air stream being approximately sufficient to vaporize all the liquid content of the fuel-air stream.

A broad apparatus aspect of the invention involves, in carburation apparatus of the type wherein passageway means is provided for directing a fuel-air mixture stream constituted of air containing droplets of a volatile liquid fuel along a path intermediate a carburetor and the combustion chamber of an internal combustion engine and wherein said passageway means is heated in order to vaporize the liquid fuel, the improvement comprising said passageway means being curvilinear for subjecting the stream to an acceleration that is transverse to the direction of stream travel and directed from one side of the passageway means, wherein the passageway means is heated by means for heating substantially solely said one side of the passageway means.

Still another broad apparatus aspect of the invention is carburation apparatus for use with internal combustion engines in establishing an improved heat exchange relationship between the stream of a fuel-air mixture containing droplets of a volatile liquid fuel and hot exhaust gases, said apparatus comprising a mixture passageway and an exhaust passageway, a heat transfer wall common to both of said passageways, said mixture passageway having inlet and outlet ends and being curved in its extent therebetween, and said common wall defining solely the radially outermost portion of the curved mixture passageway, the arrangement being such that exhaust heat is transferred preferentially to such portion of the mixture traveling in the radially outermost part of the mixture passageway.

An important though optional aspect of the invention is the step of and the apparatus for slowing down the relative velocity of unvaporized fuel as compared to air and vaporized fuel as such materials travel that part of fuel-air mixture travel path wherein heat is introduced whereby better to assure complete vaporization. Such special apparatus provision can take the form of the surface against which centrifugal forces bear and through which heat is transferred being of such character to impede the surface flow of liquid thereon and can take the form of a screen placed thereon, not for filtering as is the usual function of a screen, but for the purpose set forth above.

The full import of the invention will best manifest itself in the light of the following description of the preferred embodiments of the invention, such description being given in conjunction with the accompanying drawings illustrative thereof, wherein.

Figure 1:
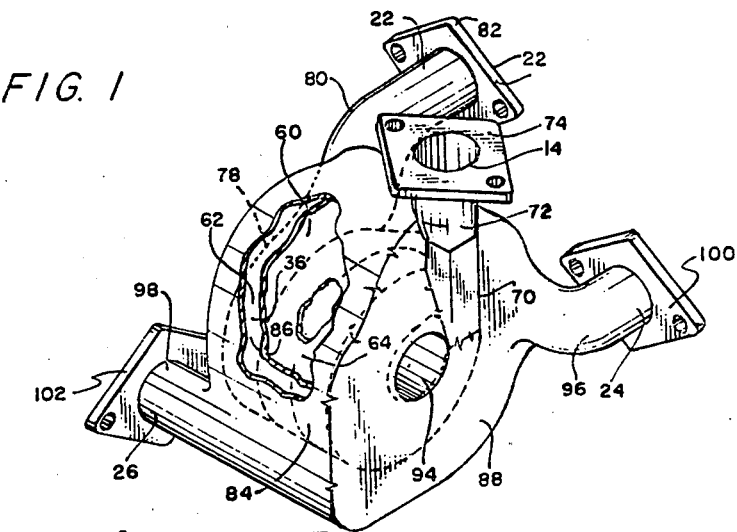
FIG. 1 is an isometric view of the vaporizer of the invention, the same being shown with parts being broken away to review the interior of the same and with certain hidden parts being shown in dashed outline.
Figure 2:
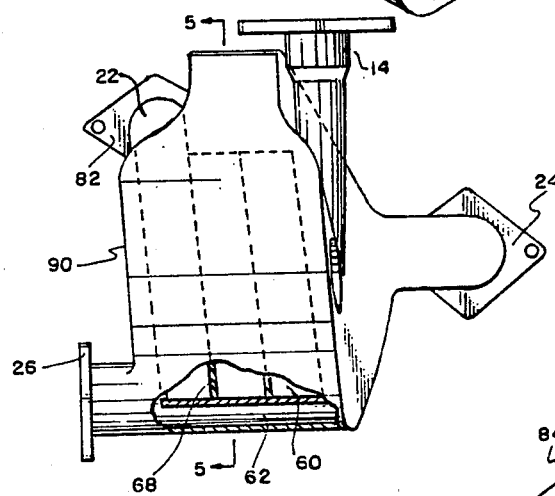
FIG. 2 is a side elevational view of the apparatus shown in FIG. 1, various parts being broken away and shown in dashed outline.
Figure 3:
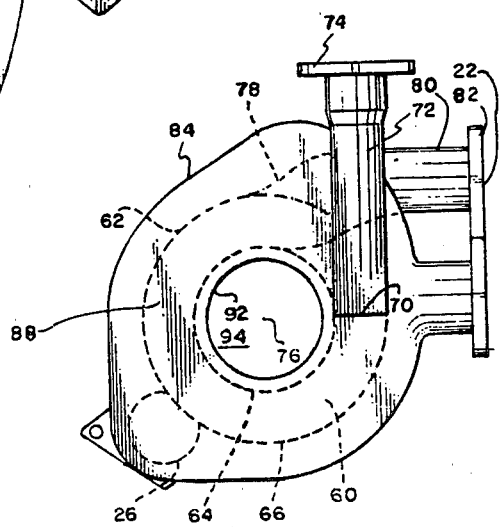
FIG. 3 is a front end elevation of the apparatus shown in FIGS. 1 and 2, with hidden details being shown in dashed outline.
Figure 4:
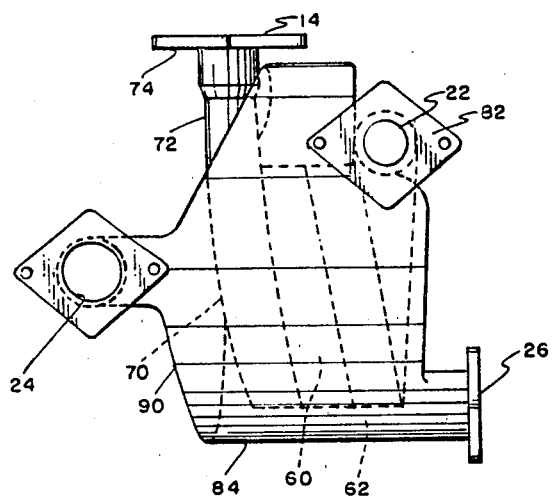
FIG. 4 is a side elevational view of the apparatus from the engine side of the same with certain hidden parts shown in dashed outline.
Figure 5:
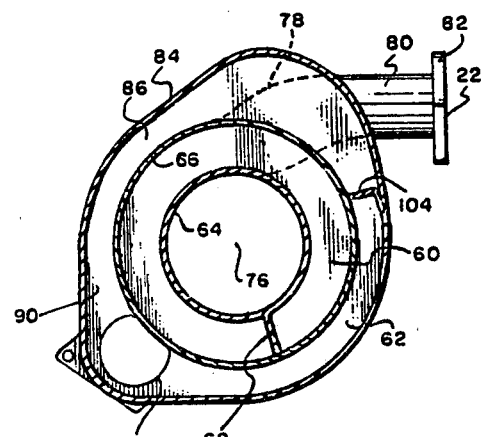
FIG. 5 is a vertical transverse sectional view taken on the plane of the section line 5—5 in FIG. 2, with certain hidden parts being shown in dashed outline.
Figure 7:
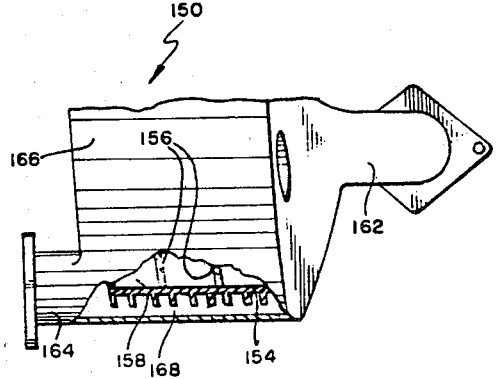
Figure 8:
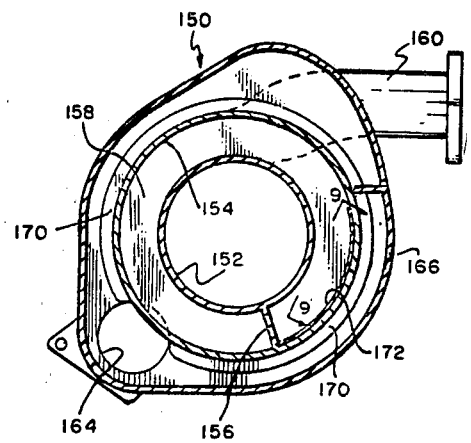
Figure 9:
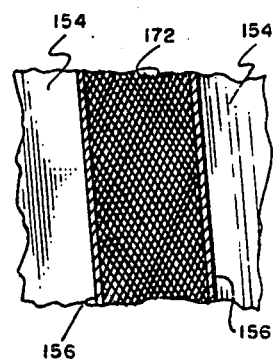

FIGS. 7 and 8 are generally similar to FIGS. 2 and 5, respectively, and disclose a modification of the vaporizing apparatus for tighter thermal coupling to hot exhaust gases and for sequestering unvaporized fuel; and, FIG. 9 is an enlarged fragmentary detail view showing the means for sequestering unvaporized fuel, this view being taken upon the plane of the line 9—9 in FIG. 8.

Referring now to the drawings wherein like numerals designate like parts throughout the various views, with reference being initially directed to the simpler embodiment of the invention shown in FIGS. 1 through 6, the reference numeral 10 designates generally an internal combustion engine with particular emphasis being given the carburation system that includes a conventional air cleaner and carburetor designated generally at 12 that normally sits atop and is fastened to the inlet 14 of the novel fuel vaporizing apparatus of the invention designated generally at 16.

Figure 6:
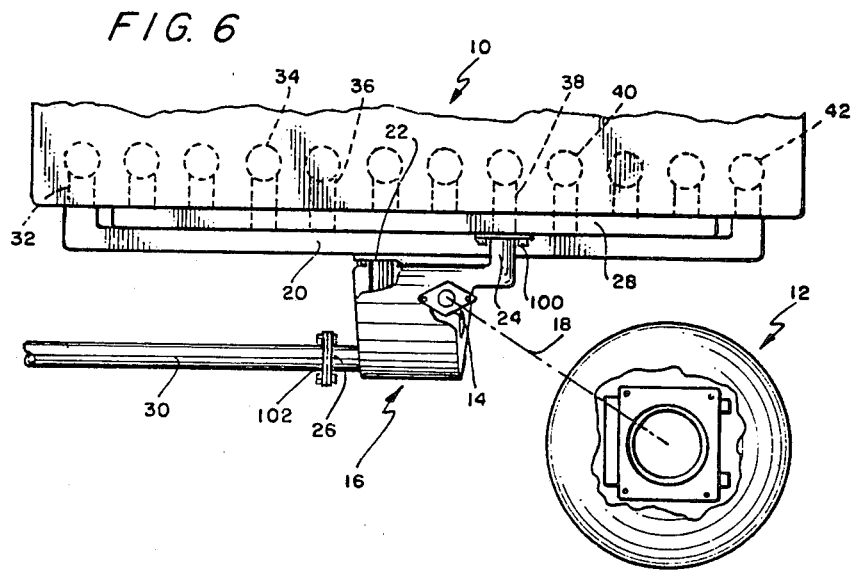
FIG. 6 is a schematic representation as viewed from above of the relationship of the apparatus to the exhaust line, the exhaust manifold, and the intake manifold of partially illustrated engine, with a dashed line indicating the detachment of the air cleaner-carburetor combination from the vaporizing apparatus.

In FIG. 6, the air cleaner-carburetor combination 12 is shown on a relatively reduced scale and as being removed from the vaporizing apparatus 16; such removal being indicated schematically by the dashed line 18.

The air cleaner-carburetor 12 is of entirely conventional character and in accordance with its customary function produces a downward stream of air into which has been introduced the proper proportion of a normally liquid fuel. Ordinarily the output stream of the combination 12 is piped or conducted directly into the intake manifold 20 of the engine 10, however, in the practice of the present invention, such stream is passed through the vaporizing apparatus 16 prior to being introduced into the intake manifold 20 by way of an outlet 22 of the apparatus 16.

The coupling of the intake manifold 20 to various inlet valves of the multicylinder engine is suggested by the dotted lines 32, 34, 36, 38, 40 and 42. Coupling of the exhaust manifold 28 to exhaust valves is similarly suggested by dotted lines 44, 46, 48, 50, 52 and 54. Though the illustrated couplings correspond to a six-cylinder engine, it will be evident that the invention can be employed with four-stroke cycle engines of 4, 6, 8, 12 or more cylinders as well as with single-cylinder engines. The cylinders can be disposed in any suitable configuration such as being in line or in directly opposing banks or in a "V" arrangement. Furthermore, the invention can, without exercise of unusual skill in the art, also be applied to two-stroke cycle engines.

Lest any misapprehension develop, it should be made clear at the outset that the particular arrangement of the inlets and outlets 14, 22, 24 and 26 are susceptible to different arrangements from those shown. For example, the apparatus 16 can be so disposed relative to the carburetor 12 that the inlet 14 and outlet 22 can both open horizontally, vertically, or open horizontally and vertically respectively.

Proceeding now to a more detailed consideration of the vaporizing apparatus 16, which is essentially a specialized form of heat exchanger, it will be seen that the same comprises a generally heliform passageway 60 for the fuel-air stream extending between the inlet 14 and the outlet 22 and an exhaust passageway 62 surrounding and in heat exchange relationship with the radially outermost periphery of the heliform passageway 60 and between the inlet 24 and the outlet 26. There is no fluid communication between the passageways 60 and 62, the arrangement being such that the entire fuel-air stream entering the vaporizer 16 through the inlet 14 exits by way of the outlet 26.

The fuel-air heliform passageway 60 is defined throughout its major axial extent by a pair of spaced concentric cylindrical walls 64 and 66 with a spiral vane 68 disposed in the annular space between the walls 64 and 66, and is fixed to the former. The spiral vane 68 is somewhat of the shape as the spiral vane extending from the shaft on agricultural augers as employed on combines and the like. Each convolution of the vane separates immediately adjacent convolutions of the heliform fuel-air stream passageway. The vane 68 is secured to the wall 64, but preferably terminates in closely spaced proximity to the wall 66. The spacing of the vane 68 from the wall 66 is just sufficient to spoil a good conductive heat transfer therebetween, it being noted that a vapor film is quite effective for this purpose. The spacing though preferred is not essential and if desired can be of a spacing constituting a tight rather than a loose sliding fit or even integrally joined together.

The walls 64 and 66 and the vane 68 are formed at one end of the heliform passageway 60 to merge and join integrally at 70 with the lower end of an upstanding conduit or pipe 72. The upper free end of the pipe 72 is provided with a mounting flange 74 and constitutes the inlet 14 that is normally connected to the air cleaner-carburetor combination 12. The juncture of the straight inlet pipe 72 and the inlet end of the heliform passageway 60 is located so that the direction of travel of the entering fuel-air mixture stream is diverted rather abruptly from a straight vertical path to a helical path such as to move substantially tangentially with respect to the axis or center line 76 about which the walls 64 and 66 are centered. Such helical travel path subjects the stream to a lateral acceleration toward the axis 76 for a prolonged travel distance of the stream.

As at the entrance to the heliform passageway 60, the walls 64 and 66 and the vane are formed to merge smoothly and integrally, as at 78, with one end of a horizontal outlet conduit or pipe 80. The free end of the pipe 80 constitutes the previously mentioned outlet 22 and is provided with a mounting flange 82 for connection to the intake manifold 20 of the engine 10.

The vaporizer 16 includes an external jacket or wall 84 that is radially spaced from the cylindrical wall 66 to define therebetween a space 86 constituting a major portion of the exhaust passageway 62. The jacket or enclosing wall 84 includes forward and rear end wall sections 88 and 90 that have the forward and rear ends of the inner cylindrical wall 64 peripherally secured thereto. In addition the wall sections 88 and 90 are provided with openings 92 in registry with the inside of the wall 64 to define a circular opening 94 that extends entirely through the vaporizer 16.

The front jacket wall 88 is formed to merge integrally with an L-shaped inlet conduit 96 that has a free end defining the inlet 24 for hot exhaust gases, and the rear jacket wall 90 is formed to merge integrally with a rearwardly extending outlet conduit 98 having a free end constituting the exhaust outlet 26. The inlet 24 and the outlet 26 are respectively provided with mounting flanges 100 and 102 for respective connection to the exhaust manifold 28 and the exhaust pipe 30.

A longitudinally extending rib 104 extends between and is connected to the cylindrical wall 66 and the jacket 84. Such rib can be parallel to the axis of the unit or if desired can be of helical form similar to the vane 68 to increase the travel path of exhaust gases through the unit.

Proceeding now to a description of the operation of the vaporizer 16, it should be noted at the outset that the cylindrical wall 66 is common to and separates the heliform passageway 60 from the exhaust passageway 62 and that the wall 66 is made of material of substantial heat conductivity. The area of the wall 66 common to both passageways 60 and 62 is substantial in relation to the size of the unit 16 so that a substantial rate of heat transfer can be effected between the fluids in the passageways 60 and 62 considering the large temperature differential normally existing between the fluids in such passageways 60 and 62.

Still two other fundamental observations should be made and these are (1) the length of the travel path of a fuel-air mixture traveling through the heliform passageway 60 that is common to the heat transfer wall 66 is very long in relation to the axial length of the vaporizing unit 16, and (2) the heat transfer wall 66 bounds and can only transfer heat directly to the radially outermost part of the passageway 60.

Exhaust gases collected by the exhaust manifold 28 are directed through the passageway 62 of the vaporizer unit 16 and are thence discharged through the exhaust pipe 30, and such exhaust gases being very hot readily transfer heat to the heat transfer wall 66 to effect the desired vaporizing action hereinafter described.

The fuel-air mixture produced by the conventional air cleaner-carburetor combination 12 is very imperfect under even the most ideal operating conditions; imperfect in the sense that the same departs drastically from being a true homogeneous mixture and in fact includes imperfectly mixed air and fuel vapor or gas not to mention a disperse liquid fuel phase constituted of a great range of particle sizes and simply called droplets herein. The degree of imperfection varies greatly with a number of variables such as throttle setting, use of choke, operation of accelerator pump, effectiveness of the venturi over a range of mass velocity, condition of carburetor and associated equipment such as the metering jets, fuel pump and the like, as well as to the condition of the liquid fuel with respect to such details as foreign matter therein such as rust, dirt, water and the like.

Even under optimum operating conditions the fuel-air mixture in some engines as introduced into the intake manifold is so imperfect that some cylinders receive much too rich a mixture while other cylinders receive much too lean a mixture; this notwithstanding the fact that the carburetor is introducing the proper proportion of liquid fuel into the air. Improper mixture ratios, especially mixtures that are too rich, result in the presence of grossly excessive amounts of pollution products in the engine exhaust gases; that this would be true even if improper ratio mixtures are mixed perfectly. It will therefore be evident that it is important that complete evaporation and mixing be achieved prior to entry into the intake manifold if the possibility of any channeling of different fuel ratios to different cylinders is to be totally eliminated.

The imperfect fuel-air mixture produced by air cleaner-carburetor combination 12 is introduced into the unit 16 at a very substantial velocity (it being recalled that a typical travel time of the mixture in ordinary automobile engine use is on the order of only one hundredth of a second) as the cross sectional dimension of the inlet pipe 72 is about the same as that of the usual or customary carburetor-intake manifold conduit. The mixture entering the unit 16 continues, on the average, at a high velocity through the unit 16 as the cross sectional area of the passageway 60 is about that of the inlet pipe 72.

Not only does the helical form of the passageway 60 greatly extend the length of the travel path of the mixture relative to the usual straight line distance from the carburetor to the inlet of the intake manifold, such travel path extension and the helical form thereof cause (1) the travel time to be extended greatly relative to the usual travel time as is essential if significant modification of the degree of mixing is to simply have time to be effected, and (2) the mixture is subjected to a substantial and continuing transverse acceleration throughout its travel in the heliform passageway 60 with force against the mixture stream to effect such acceleration being applied against the stream by the heat transfer wall 66. In other words, the fuel-air mixture stream is centrifuged throughout its travel through the heliform passageway 60 in such a manner that the most dense parts are caused to migrate toward the wall 66. Unvaporized fuel is far more dense than air and consequently unvaporized fuel tends to move radially outward toward the hot wall 66, with such movement tending to be at a greater rate with increasing size of aggregations of unvaporized fuel in accordance with Stoke's law, that is, larger droplets move faster than smaller droplets or the finest fog-like liquid particles toward the wall 66 and all the sooner come into contact with and are heated by the wall 66.

The fuel-air stream is centrifuged for a sufficient length of its path by reason of its velocity and the curvilinear character of the path so that the liquid content is not only impinged in continuous vaporizing contact with but is held against the hot wall for a protracted period sufficient to become vaporized. The liquid content in contact with the hot wall is not free to re-enter the main stream as it would then simply reacquire a velocity to be subject to large centrifugal forces.

Not only is the liquid content moved into sustained vaporizing contact with the hot wall, such liquid as an important incident of its preferential heating by direct contact with the hot wall serves to separate and thermally insulate the continuous air and vapor phase of the stream from the hot walls. The thin sheet or film of liquid in the vaporizing contact with the wall serves such separating and thermal insulation functions so as to minimize heat transfer from the hot wall to the continuous air and vapor phase as the vaporizing liquid is taking up its latent heat of vaporization and is itself suffering very little increase in its sensible heat.

It will be appreciated that the term "vapor" as used in this specification and in the appended claims has reference to matter in its gaseous state as distinguished from liquid and solid states. The character of the vapor in the fuel-air stream will vary from point to point from essentially pure air to essentially pure vaporized fuel and all proportions therebetween. Needless to say, the stream will, according to the objectives of the invention, become entirely vapor (no liquid content however finely dispersed) and of uniform composition (homogeneous).

In view of the foregoing, it will be manifest that heat energy of the exhaust is transferred preferentially to the liquid or unvaporized content of the fuel-air mixture, and that the velocity of such content is preferentially slowed so that it may be said that the liquid content is preferentially sequestered in the unit 16. Such selective or preferential sequestration or extension of the dwell time of the unvaporized content of the fuel-air mixture is due to the liquid content of the mixture stream losing whatever velocity it may have had by way of being entrained in the air as a disperse phase therein and takes on such velocity as it may acquire as a viscous more or less continuous phase in contact with a stationary wall 66.

The helical length of the passageway 60 and its cross sectional area are so related to the area of the heat transfer wall 66 that all of the liquid fuel centrifuged against the latter is vaporized prior to its exit from the unit 16 and the entry of the fuel-air mixture into the intake manifold.

The deflection in the path of the fuel-air mixture to cause the centrifugal action must be sustained along a considerable travel path and not merely enough to impinge liquid droplets against a side wall as could occur at a 90° elbow, so that the liquid content is not merely impinged but is held against the radially outward confines of the path for a substantial length of the latter.

The curvilinear length of the helical path preferably exceeds one full turn with 1.5 to 3 turns (540° to 1080°) being normally adequate. To a considerable extent the angular length of the helical path depends on the radial dimension of the curvilinear path; increasing radial thickness tends to require greater angular length or displacement. The radius of curvature does not have to be constant and can vary along the path length as long as the centrifugal force is large enough along the curvilinear path to maintain the liquid in vaporizing contact with the wall 66.

The unit 16 is preferably of metallic construction, though any material that can bear up to the temperature and pressure conditions prevailing during use can be employed, it only being otherwise essential that the heat transfer wall 66 possess the requisite thermal conductivity to pass heat at a rate great enough to vaporize all the liquid content of the fuel-air stream. The temperature of the exhaust, which typically ranges from about 400° C. to 1400° C., indicates that the outer jacket wall should be steel, though the remainder of the unit can be of lower melting metals if deemed necessary or convenient.

The preferred material is sheet, possibly stainless, steel and, of course, parts could be steel casting. The fabrication methods and materials are simply engineer's choice, and he can easily make such technical decisions on the basis of the desideratums herein set forth in detail.

A fire screen, not shown, can be placed at the inlet and/or the outlet of the unit 16 to prevent engine backfire to reach the carburetor, as will be evident to those skilled in the art.

Passing now to the modified form of the vaporizer unit shown in FIGS. 7, 8 and 9 and designated generally at 150, it is to be understood that such modified unit 150 is employed in the same manner and departs from the described unit 16 only in particulars hereinafter specifically pointed out. Such particulars as will be detailed shortly are only two in number; one being the provision of fins on the exhaust gas side of the heat transfer wall so as to enhance the flow of heat from the exhaust gas to the heat transfer wall, and the other has to do with means on the fuel-air mixture side of the heat transfer wall to impede the flow of liquid fuel therealong.

The unit 150 comprises inner and outer cylindrical walls 152 and 154 defining jointly with a spiral vane 156 a heliform passageway 158, such elements corresponding to elements 64, 66, 68 and 60 respectively of the unit 16. It is preferred, though not essential, that the vane 156 not be in direct thermal engagement with the outer wall 154. The unit 150 includes a fuel-air mixture outlet pipe 160 and exhaust inlet and outlet pipes that correspond to previous described elements 96 and 98. The unit 150 includes an outer jacket wall 166 that corresponds to the wall 84 and encloses an exhaust passageway 168 that generally corresponds to the previously described exhaust passageway 62.

As clearly shown in FIGS. 7 and 8, the external surface of the heat transfer wall 154 is provided with a plurality of integral fins 170 that project radially into the exhaust passageway 168 toward the jacket wall 166 while terminating in spaced relationship to the latter. Quite obviously, the fins 170 serve to tighten the thermal coupling between the heat transfer wall 154 and the exhaust gases as the latter pass through the unit 150.

The means previously alluded to for impeding the flow of liquid against the heliform passageway 158 side of the heat transfer wall 154 comprises a metal screen 172 disposed between a pair of adjacent convolutions (see FIG. 9) of the vane 156 and seated tightly against the inner side of the wall 154. The screen 172 can simply be tightly wedged into position or fixed in any desired manner as by brazing or the like. The metallic screen 172 can conveniently be of copper or aluminum to effect a good heat transfer, while impeding liquid flow against the inner surface of the wall 154 by forcing the liquid to follow a tortuous path.

The screen 172 can extend the entire length of the heliform passageway 158, but only a minor portion of such length is considered to be quite adequate. As shown in FIG. 8, the screen extends less than one-half of a convolution of the passageway 158 and can be about midway along the length of the latter. Needless to say, the screen 172 can extend along the entire or any part of the passageway 158 and even be dispensed with entirely as in the case of the unit 16. In a similar fashion the fins 170 can be used whether or not the screen 172 is included.

As no further description or explanation will be necessary for those of very modest capability in the art for them to avail themselves fully of complete enjoyment of the invention, attention is now directed to the appended claims for an appreciation of the actual scope of the invention.

I claim:

1. In a carburation process as practiced in the operation of an internal combustion engine running under varying load conditions wherein heat is supplied to an imperfect fuel-air mixture of the ratio to be burned in the engine and constituted of a stream of air containing droplets of a volatile liquid fuel in order to vaporize substantially all of the liquid contained in such mixture and to improve the intimacy of the fuel-air mixture prior to its introduction into the combustion chamber of an internal combustion engine, the improvement in the operation of the engine when the same is under heavy load condition comprising minimization of the amount of heat energy supplied by supplying the heat energy preferentially and substantially solely to the relatively dense liquid phase of the fuel as compared to the vapor thereof and the air by directing the entire stream to flow along a spiral path having a plurality of convolutions, maintaining substantial fluid flow isolation between adjacent convolutions of the stream, said path having a radially outermost flat portion thereby to urge preferentially the entirety of the relatively dense liquid phase of the mixture toward and to maintain substantially the entirety of the liquid phase at the radially outermost portion of the spiral path, while contacting the fuel-air stream along the radially outermost portion of its spiral path by a heat conducting material, heating the heat conducting material, with the rate of supply of heat energy to the fuel-air stream being approximately sufficient to vaporize all the liquid content of the fuel-air mixture, and allowing liquid so vaporized freely to diffuse in the stream radially inwardly along said spiral path.

2. The process of claim 1, including the step of retarding the rate of flow of liquid fuel along the radially outermost portion of the spiral path by providing a zone of physical obstructions across the path to force such liquid to follow a tortuous path, whereby such liquid is in contact with the heat conducting material for sufficient time to evaporate.

3. In the carburation of an internal combustion engine operating under heavy load conditions, the process of vaporizing and preferentially heating the liquid phase content of a stream of fluid comprising a vapor phase inclusive of air having dispersed therein a relatively dense and liquid phase of a volatile liquid comprising, while the engine is under a heavy load condition, the step of moving the substantial entirety of the liquid phase toward a lateral boundary of the stream by subjecting the stream to a force that is transverse to the direction of movement of the stream and directed toward the stream from such lateral boundary thereof, and the step of introducing heat energy into the stream substantially solely through said lateral boundary while maintaining said force along the path of the stream until substantially all of the liquid phase has been evaporated as the stream progresses beyond a predetermined portion of its path, and the step of concurrently diffusing evaporated fuel into the stream by maintaining free fluid communication across the entire transverse extent of the stream from the lateral boundary thereof.

4. The process of claim 3, including the step of reducing the velocity of the liquid fuel phase adjacent said lateral boundary by partially obstructing the flow of the liquid fuel phase adjacent said lateral boundary through the use of obstructions that are transverse to the stream to force the same to follow a tortuous path.

5. Carburation apparatus for an internal combustion engine having an intake comprising a carburetor for producing as its entire output a single fuel-air mixture stream constituted of air containing droplets of a volatile liquid fuel, a single passageway means for directing the entire stream produced by the carburetor along a spiral path having a plurality of convolutions while preventing direct fluid communication between portions of the stream traveling adjacent convolutions to the intake of an internal combustion engine, said path having a length sufficient to subject the stream to a sustained acceleration that is transverse to the direction of the spiral path and directed from one side of the passageway means, with such acceleration being sufficient in magnitude and duration to centrifugally move substantially all of the content of the liquid droplets of the entire stream against said one side of the passageway means, said passageway means being free of obstructions to centrifugal movement of the droplets, and means for heating substantially solely said one side of the passageway means, whereby substantially all the liquid content of the stream is preferentially heated without substantially elevating the temperature of the air content of the stream.

6. The combination of claim 5, wherein said one side of said passageway means for the fuel-air mixture comprises a wall of heat conductive material having first and second sides, exhaust conduit means for hot combustion products of the engine comprised in part of said wall with the latter serving to accept exhaust heat through its second side and to deliver heat to the fuel-air stream through its first side, said wall having its first side provided with obstruction means disposed transversely to the extent of the passageway means for reducing the rate of fluid flow of the fuel-air stream immediately next thereagainst, whereby the relatively dense droplets are caused by reason of the acceleration to travel preferentially adjacent the first side of said wall and are retarded in travel along the wall to prolong the heating thereof.

7. Carburation apparatus for use with internal combustion engines in establishing an improved heat exchange relationship between a wet fuel-air mixture containing droplets of a volatile liquid fuel and hot exhaust gases for obtaining a substantially dry mixture of minimized temperature, said mixture passageway having inlet and outlet ends for respectively receiving and discharging the mixture in wet and dry condition, said apparatus comprising a single curved mixture passageway of spiral configuration with adjacent convolutions being sufficiently isolated from each other to assure that essentially the entire mixture travels the entire spiral extent of the passageway, said mixture passageway being free of any internal obstruction to radial fluid movement, an exhaust passageway with a heat conductive wall common to both of said passageways, and said common heat conducting wall defining solely the radially outermost portion of the curved mixture passageway, the arrangement being such that exhaust heat is transferred from the exhaust passageway by conduction of the heat conducting wall preferentially and essentially solely to only that portion of the mixture in the radially outermost part of the mixture passageway rather than to that portion of mixture in the radially innermost portion of the mixture passageway.

8. The combination of claim 7, wherein said common wall is of generally cylindrical configuration, and wherein the mixture passageway is further defined by an inner, generally cylindrical and hollow wall spaced radially within the common wall and is thereby remote from the exhaust passageway to constitute the inner side of the spiral configuration.

9. Carburation apparatus for use with internal combustion engines in establishing an improved heat exchange relationship between a fuel-air mixture containing droplets of a volatile liquid fuel and hot exhaust gases for obtaining a substantially dry mixture of minimal temperature, said apparatus comprising a mixture passageway of helical configuration of a plurality of convolutions for conducting all the fuel-air mixture that is fed to the engine, an exhaust passageway disposed about the mixture passageway, a heat transfer wall common to both of said passageways, said mixture passageway having inlet and outlet ends for respectively receiving and discharging a fuel-air mixture, said convolutions being sufficiently isolated from each other essentially to prevent any fluid flow between adjacent convolutions, said mixture passageway being free of any internal obstruction to radial fluid movement, said common heat transfer wall defining solely the radially outermost portion of the helical mixture passageway, the arrangement being such that exhaust heat is transferred preferentially and substantially solely only to such portion of the mixture traveling in the radially outermost part of the mixture passageway, said heat transfer wall being of generally cylindrical configuration, with the mixture passageway being further defined by an inner, generally cylindrical and hollow wall spaced within the heat transfer wall and remote from the exhaust passageway to constitute the inner side of the helical configuration, and said mixture passageway including a helical partition wall disposed between the heat transfer wall and the inner wall so as to separate adjacent convolutions of the helical mixture passageway, said partition wall being of substantially uniform thickness throughout its radial extent, and means for reducing the transfer of heat from the heat transfer wall to the radially outermost portion of the partition wall.

10. Carburetion apparatus for use with internal combustion engines in establishing an improved heat exchange relationship between a fuel-air mixture containing droplets of a volatile liquid fuel and hot exhaust gases for obtaining a substantially dry mixture of minimal temperature, said apparatus comprising a mixture passageway of helical configuration of a plurality of convolutions for conducting all the fuel-air mixture that is fed to the engine, an exhaust passageway disposed about the mixture passageway, a heat transfer wall common to both of said passageways, said mixture passageway having inlet and outlet ends for respectively receiving and discharging a fuel-air mixture, said convolutions being sufficiently isolated from each other essentially to prevent any fluid flow between adjacent convolutions, said mixture passageway being free of any internal obstruction to radial fluid movement, said common heat transfer wall defining solely the radially outermost portion of the helical mixture passageway, the arrangement being such that exhaust heat is transferred preferentially and substantially solely only to such portion of the mixture traveling in the radially outermost part of the mixture passageway, said heat transfer wall being of generally cylindrical configuration, with the mixture passageway being further defined by an inner, generally cylindrical and hollow wall spaced within the heat transfer wall and remote from the exhaust passageway to constitute the inner side of the helical configuration, and said mixture passageway including a helical partition wall disposed between the heat transfer wall and the inner wall so as to separate adjacent convolutions of the helical mixture passageway, and means for reducing the transfer of heat from the heat transfer wall to the radially outermost portion of the partition wall.

11. A method for providing a more complete molecular mixture of fuel and air molecules for more efficient, complete and pollution emission free combustion in an internal combustion engine with the temperature of the air being increased a minimal extent comprising centrifugally withdrawing substantially all the droplets of liquid fuel from suspension in the air and placing them, to the substantial exclusion of the air, upon a heated surface by passing all such air along a spiral path between the carburetor to the combustion chamber of the engine, with the heated surface defining solely the radially outermost portion of the path, converting heat provided by the heated surface into latent heat energy of the withdrawn liquid fuel in the form of molecular repelling forces which cause the liquid fuel molecules to burst away from each other and disperse into wide separation, continuing the use of the molecular repelling forces to acquire substantially equal distribution of all of the fuel molecules among the equally distributed air molecules passing along the spiral path to thereby assure the most complete efficient and pollution emission free combustion possible.

12. The method of attaining substantially equal molecular fuel distribution in the combustion chamber of an internal combustion engine comprising rotating the air and fuel as they pass through a spiral passageway to centrifuge substantially all the content of the liquid fuel droplets from suspension in the air stream and into contact with a cylindrical heat conductive wall defining the radially outermost extent of the spiral passageway and also serving as a heating surface to conduct heat into the fuel centrifugally placed upon the wall of the spiral passageway, such cylindrical wall having a circumference that is small relative to the length of the spiral passageway, maintaining the wall at an elevated temperature to energize the liquid fuel contacting the same for conversion into a molecular dispersing vapor state supported by molecular repelling forces to attain substantially equal molecular distribution by the rush of the molecules to establish equal molecular pressure within their container, whereby the temperature of the air is increased a minimal extent and more efficient and pollution emission free combustion can be realized.

13. A helical intake manifold passageway adapted to be disposed between the carburetor and the combustion chamber of an internal combustion engine comprising a cylindrical shaped hollow tube defining an inner wall of the helical passageway, a cylindrical shaped tube defining an outer wall of the passageway, a helical partition between the inner and outer walls and serving to substantially entirely isolate adjacent convolutions of the helical passageway against fluid flow therebetween, a heat conduction impedance between the radially outermost extent of the partition and the outer wall, said partition having a thickness less than about that of the outer wall, and means for supplying heat to the outside of the outer wall in an arrangement such as to heat liquid fuel centrifuged thereagainst so as to vaporize and to diffuse the vaporized molecules back into the air in the helical passageway.

* * * * *